United States Patent
Tian et al.

(10) Patent No.: US 11,375,550 B2
(45) Date of Patent: Jun. 28, 2022

(54) SEQUENCE SELECTION FOR NON-ORTHOGONAL MULTIPLE ACCESS TRANSMISSIONS

(71) Applicant: ZTE Corporation, Guangdong (CN)

(72) Inventors: Li Tian, Guangdong (CN); Wei Cao, Guangdong (CN); Sha Wang, Guangdong (CN); Yifei Yuan, Guangdong (CN); Zhifeng Yuan, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/908,525

(22) Filed: Jun. 22, 2020

(65) Prior Publication Data

US 2020/0322994 A1   Oct. 8, 2020

Related U.S. Application Data

(63) Continuation of application No. PCT/CN2017/118078, filed on Dec. 22, 2017.

(51) Int. Cl.
*H04W 74/08* (2009.01)
*H04W 76/27* (2018.01)
(Continued)

(52) U.S. Cl.
CPC ....... *H04W 74/0833* (2013.01); *H04L 41/142* (2013.01); *H04W 4/06* (2013.01); *H04W 76/27* (2018.02)

(58) Field of Classification Search
CPC ... H04W 74/0833; H04W 76/27; H04W 4/06; H04L 41/142; H04J 13/16
(Continued)

(56) References Cited

U.S. PATENT DOCUMENTS

2007/0248009 A1* 10/2007 Petersen ............. H04L 12/4633
  370/412
2010/0302956 A1* 12/2010 Haverty ................... H04K 3/45
  370/252
(Continued)

FOREIGN PATENT DOCUMENTS

CN   102404854 A   4/2012
CN   107343322 A   11/2017

OTHER PUBLICATIONS

Wherein the selecting the MA signature comprises: randomly selecting the MA signature from at least one set of MA signature sequences, wherein the randomly selecting the MA signature is based on at least one random distribution and associated random distribution parameters. (Year: 2016).*
International Search Report and Written Opinion dated Aug. 22, 2018 for International Application No. PCT/CN2017/118078, filed on Dec. 22, 2017 (6 pages).
(Continued)

*Primary Examiner* — Inder P Mehra
(74) *Attorney, Agent, or Firm* — Perkins Coie LLP

(57) ABSTRACT

Optimizing the resource configuration or selection for grant-free contention-based non-orthogonal multiple access (NOMA) transmissions is an effective way to increase network capacity and reduce multi-user interference at the user equipment (UE). In some embodiments, a network node may determine the current traffic load, select multiple access (MA) sequences for the UE based on the determination, and transmit this selection to the UE for subsequent transmissions. In other embodiments, the UE may receive a message with an indication of the traffic load being experienced by the base station that the UE is attempting to connect to, and then may randomly select an MA sequence for subsequent transmissions.

22 Claims, 8 Drawing Sheets

(51) Int. Cl.
*H04W 4/06* (2009.01)
*H04W 28/16* (2009.01)
*H04L 41/142* (2022.01)

(58) Field of Classification Search
USPC .......................................................... 370/328
See application file for complete search history.

(56) References Cited

U.S. PATENT DOCUMENTS

| | | | |
|---|---|---|---|
| 2012/0231828 A1* | 9/2012 | Wang ................ | H04W 74/0833 455/517 |
| 2014/0192767 A1* | 7/2014 | Au .................... | H04W 74/0866 370/329 |
| 2016/0119958 A1* | 4/2016 | Tan .................... | H04W 74/006 370/336 |
| 2017/0041805 A1* | 2/2017 | Chandrasekhar ..... | H04L 1/1896 |

OTHER PUBLICATIONS

LG Electronics, "General procedures for grant-free/grant-based MA," 3GPP TSG RAN WG1 Meeting #86bis, Lisbon, Portugal, R1-1609228, 3 pages, Oct. 2016.
Nokia, et al., "On MA resources for grant-free transmission," 3GPP TSG-RAN WG1#86bis, Lisbon, Portugal, R1-1609647, 4 pages, Oct. 2016.
Samsung, "Discussion on grant-free/contention-based non-orthogonal multiple access," 3GPP TSG RAN WG1 Meeting #86, Gothenburg, Sweden, R1-166752, 5 pages, Aug. 2016.
LG Electronics, "On MA resource and MA signature configurations," 3GPP TSG RAN WG1 Meeting #86bis, Lisbon, Portugal, R1-1609227, 3 pages, Oct. 2016.
Office Action for Chinese Patent Application No. 201780097507.5, dated Jul. 22, 2021 (13 pages).
Office Action for Chinese Patent Application No. 201780097507.5, dated Mar. 2, 2022 (5 pages).

* cited by examiner

SEQUENCE SELECTION FOR NON-ORTHOGONAL MULTIPLE ACCESS TRANSMISSIONS

CROSS REFERENCE TO RELATED APPLICATIONS

This patent document is a continuation of and claims benefit of priority to International Patent Application No. PCT/CN2017/118078, filed on Dec. 22, 2017. The entire content of the before-mentioned patent application is incorporated by reference as part of the disclosure of this application.

TECHNICAL FIELD

This document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document relates to methods, systems, and devices for non-orthogonal multiple access (NOMA) transmission. In some disclosed embodiments, a user equipment uses an MA sequence to communicate with a base station such that the selection of the MA sequence is based on a current traffic load being experienced by the base station.

In one exemplary aspect, a wireless communication method is disclosed. The method includes generating statistics indicative of a current traffic load at the network node, selecting a multiple access signature for at least one user device based on the statistics, wherein the MA signature is used to receive a contention-based transmission, and transmitting a message indicative of the MA signature.

In another exemplary aspect, another wireless communication method is disclosed. The method includes receiving a message from a network node, wherein the message is indicative of a current traffic load at the network node, selecting a multiple access signature based on the message, and performing a contention-based transmission to the network node using the MA signature.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
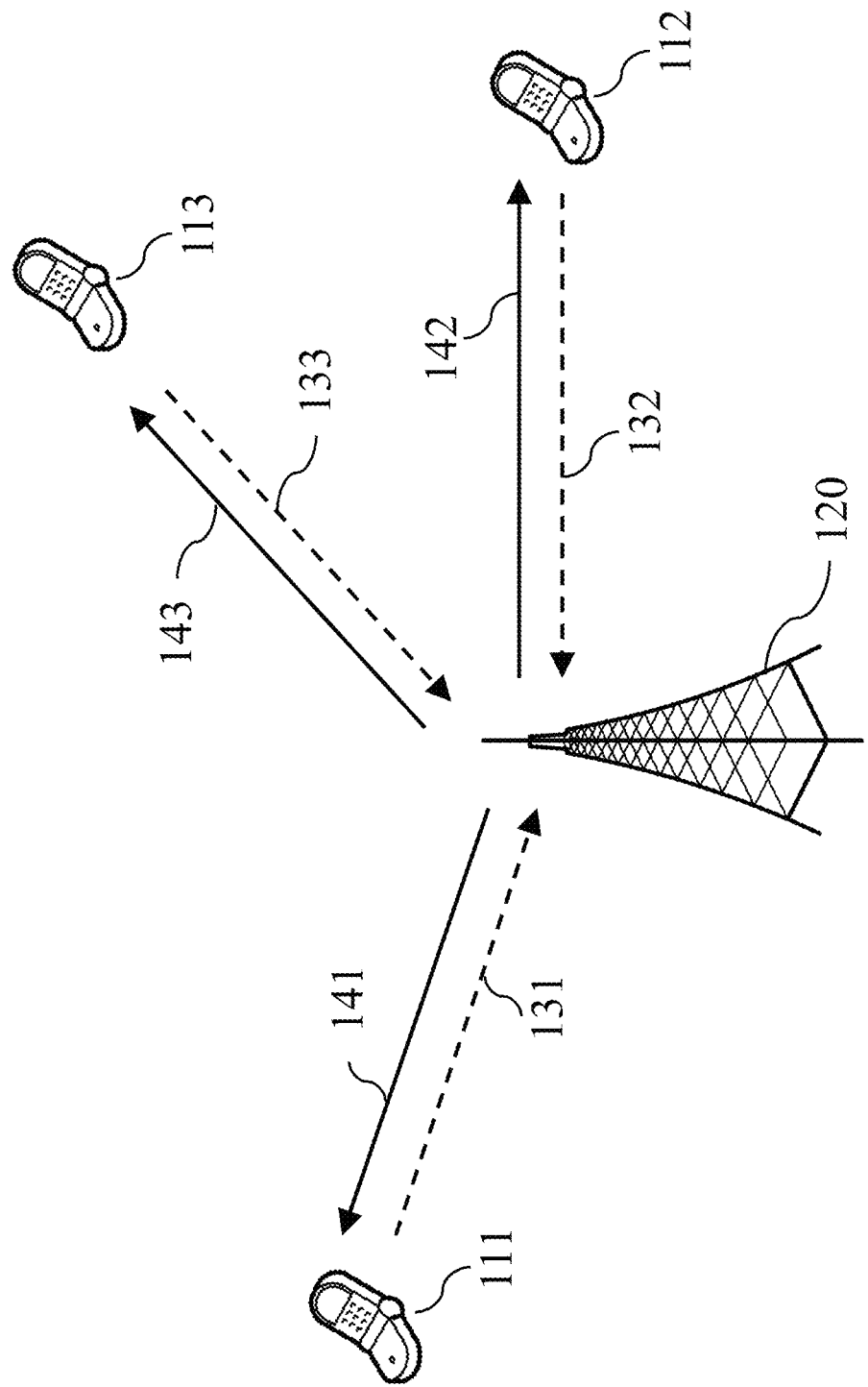
FIG. 1 shows an example of a base station (BS) and user equipment (UE) in wireless communication.

In wireless communication systems, two different types of channel access strategies are often used: contention-free transmissions in which a wireless device is given exclusive access to transmission resources and may transmit, and contention-based transmissions in which a wireless device competes with other wireless devices for transmission resources. In some implementations, the contention-based access may be performed in cellular systems such as the upcoming 5G communication systems.

In contention-based grant-free transmissions, as the name implies, the UE can autonomously transmit packets without the need to send the scheduling request and to wait for the dynamic grant. The benefits of such request-free and grant-free scheduling include reduced signaling overhead, reduced UE power consumption, reduced latency, etc. Grant-free scheduling may be either orthogonal resource based, or non-orthogonal multiple access based. In the former, even though the resources themselves are orthogonal, different users may select the same resource, thus causing collisions occasionally. Whenever such collisions occur, the link performance may become significantly degraded. Hence, the resource utilization of orthogonal resource based grant-free transmission is not high. In contrast, a grant-free transmission with non-orthogonal multiple access (NOMA) is capable of handling more number of overlapped or collided users, without severe loss of performance, due to the transmitter side processing and the advanced receiver.

Transmitter side processing of grant-free NOMA is directed toward keeping the per-UE spectral efficiency low, while introducing good characteristics of transmit signals to facilitate multi-user interference cancellation at the receiver side. There are different ways to keep the bit rate low and to distinguish different UEs, e.g., multiple access (MA) signatures. For example, a UE-specific MA signature may include spreading sequence/code, interleaver/scrambler pattern, or even a preamble or demodulation reference signal. The MA signatures may be operated at modulation symbol level, or at coded-bit level or at both.

The grant-free NOMA transmission may be implemented in different scenarios:

In some embodiments, referred to as grant-free semi-persistent scheduling (SPS), the UE's resources are pre-configured (i.e., time-frequency resources are periodically allocated and MA signatures are pre-configured), and each time when a packet arrives, the UE may autonomously choose the nearest transmission opportunity for the uplink transmission.

In other embodiments, the UE may randomly select a resource at any time for uplink transmissions, leading to contention-based transmissions. For these embodiments, the base station (BS) may perform blind detection either for UE identification or activation.

In this disclosure, a sequence selection to optimize the cross-correlation property and the interference among multiple UEs performing grant-free NOMA transmissions is described. Some characteristics of disclosed technology include: (1) the BS calculates or estimates the statistics of the traffic load (e.g., average number of UEs shared on the same resources, or the equivalent average traffic arrival rate), and communicates this information to the UE (e.g., by broadcasting, RRC signaling or group-common DCI signaling), and (2) the UE implements an adjustable sequence selection principle based on the parameter of the traffic load.

The disclosed technology may be used to implement embodiments that use the resource configuration or selection for grant-free contention-based non-orthogonal multiple access (NOMA) transmissions as an effective way to increase network capacity and reduce multi-user interference at the user equipment.

FIG. 1 shows an example of a wireless communication system that includes a base station (BS) 120 and one or more user equipment (UE) 111, 112 and 113. The UEs may share some transmission resources when transmitting from the UEs to the base station (e.g., uplink transmissions).

The base station 120 may generate statistics indicative of which of at least UEs 111, 112 and 113 are attempting to initiate uplink transmissions to the base station 120. The base station may then select multiple access (MA) signature sequences for each of the UEs based on the current traffic load. The base station may then transmit messages (131, 132, 133) to the UEs (111, 112, 113, respectively) indicating which MA signature sequences may be used for subsequent transmissions (e.g., 141, 142, 143) by the UEs to the base station. In some embodiments, the MA signature sequences may be selected from predefined sets of MA signature sequences.

Figure 2:
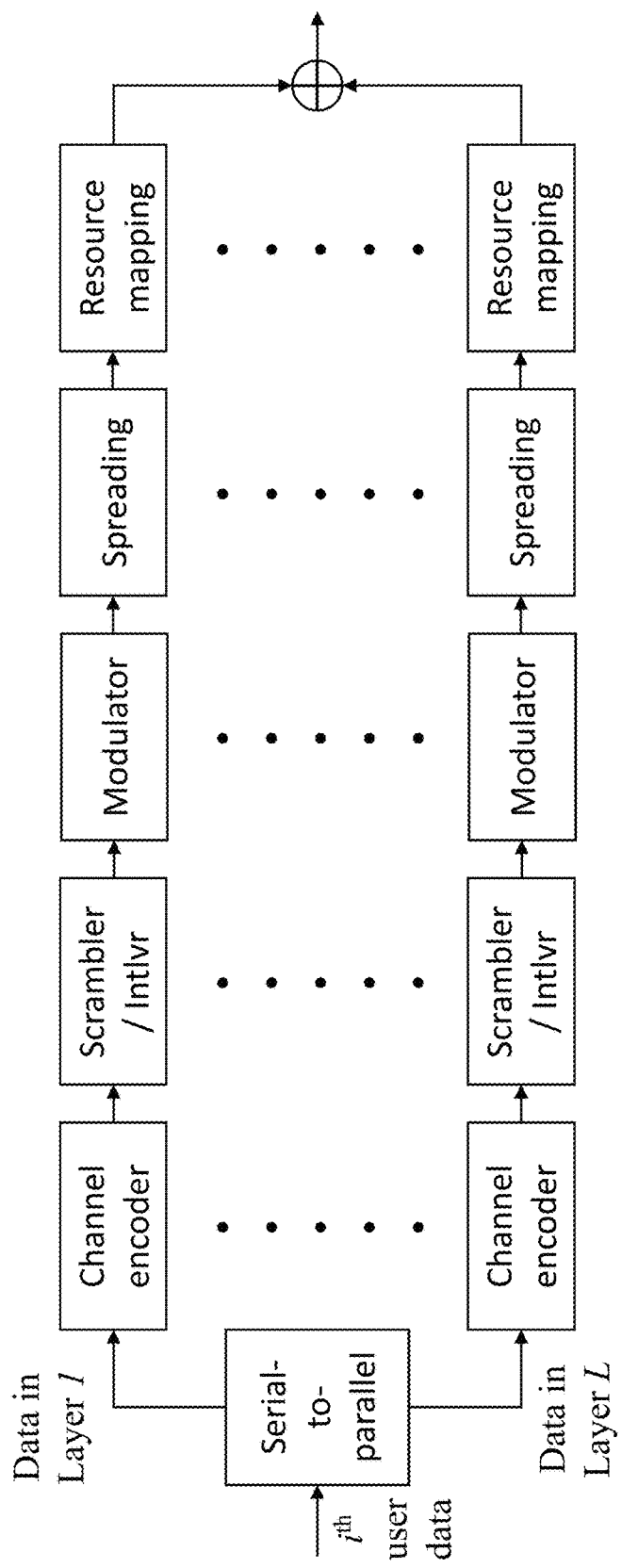
FIG. 2 shows a block diagram of an example of a transmitter that implements a NOMA scheme.

FIG. 2 shows a block diagram of an exemplary transmitter for NOMA schemes. In an example, NOMA schemes may involve channel coding with UE-specific interleaving and/or scrambling, UE-specific bit-to-symbol mapping, or UE-specific spreading. In some embodiments, multi-layer transmissions per user may be implemented. In other embodiments, high per-user spectral efficiency may be achieved by using layer-specific MA signatures.

Figure 3:
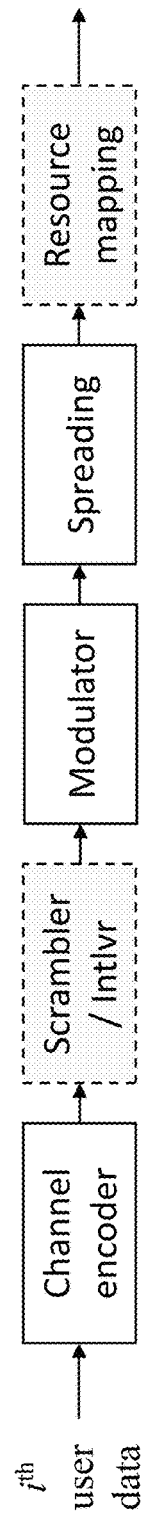
FIG. 3 shows a block diagram of an example of a transmitter for a symbol-level spreading based NOMA scheme.

In some embodiments, for a particular NOMA scheme, not all the processing blocks depicted in FIG. 2 may be used. For example, symbol-level spreading based NOMA scheme is shown in FIG. 3, where UE-specific spreading sequences are mainly used for UE differentiation and interference reduction, and the other blocks may be deactivated. Embodiments of the disclosed technology may implement the spreading in either the time or frequency domain, and at either the resource element (RE) level or the resource block (RB) level.

For some embodiments of symbol-level spreading based NOMA schemes, the cross-correlation property of the spreading sequences between different UEs may be crucial to overall system performance, since the interference level may be primarily determined by the code domain cross-correlation when different UEs share the same time-frequency resources.

The cross-correlation is related to the spreading factor (SF) and the size of the set from which the MA sequences are selected. In an example, if the spreading length of the MA signature sequence is longer, a smaller overall cross-correlation may be achieved. In another example, a larger set (or pool) of MA sequences may be used to accommodate more UEs for a given spreading factor, but this may inevitably result in higher cross-correlation.

Embodiments of the disclosed technology, which optimize resource configuration or selection for grant-free contention-based NOMA transmissions, may consider different sizes of MA sequences sets (or pools) and various selection mechanisms in order to enable, for example, reduced signaling overhead, reduced UE power consumption, and reduced transmission latency.

Accordingly, in some embodiments, when number of UEs in a cell or traffic load on the BS are changing, the BS calculates or estimates an average number of UE multiplexed on the same resources and signals an indication of the network load to the UEs.

For ease of understanding, the present document describes SPS-based grant-free and random selection based grant-free transmission cases separately. For both cases, a pool or multiple pools, from which each MA signature is selected, may be pre-defined and known by both BS and UE, either disclosed in the specification or provided by BS broadcasting.

In SPS-based grant-free transmission, the UE's resources including time-frequency resources and MA signatures are pre-configured by BS; this configuration is mainly used for uplink data transmission when the UE is in RRC-connected mode. BS knows how many UEs are connected, but the number of UEs that initiate the uplink transmissions should be blindly detected by BS at each time. When the uplink traffic load is dynamically changing, it may be necessary to adjust the configurations (e.g., MA sequences assigned to UEs) to control the overall interference level.

In some embodiments, BS may use RRC signaling to inform the UE-specific MA signature(s). BS may calculate the statistics of the number of successfully detected UEs periodically or triggered by event. For example, the event may be an increase in uplink transmission initiations, a received report or request, or the like. BS may adjust the UE-specific MA signatures in the RRC signaling according to the number of active UEs.

In some embodiments, UEs need not know whether there are other UEs that are sharing the same time-frequency resource. The UEs are configured to use the BS-configured MA signature in the transmitter side processing.

The MA signature pool may be a pool of one or more of the following waveform parameters or characteristics: interleaver pattern, scrambling sequence, spreading sequence, demodulation reference signal, precoder matrix and joint modulation and coding constellation.

A large MA signature pool including multiple subsets (sub-pools) or multiple MA signature pools may be predefined and known by both BS and UE. Different (sub-)pools may have different (sub-)pool sizes or spreading factors, which may affect the eventual perceived interference level. For example, with the same spreading factor, a larger pool size results in poorer cross-correlation properties. According to the current traffic load, BS may decide which (sub-)pool should be used, and may configure each UE with the UE-specific MA signature in that (sub-)pool.

The example of MA signature selection in a symbol-level spreading scheme is considered. The MA signature discussed herein is a UE-specific spreading sequence. Other MA signatures or a combination of multiple MA signatures may utilize the same procedures described in this example. Although only one data stream per UE is assumed in the example, multiple data streams per UE are supported, and may be regarded as multiple UEs in the procedure-wise discussions.

In Example 1 for SPS-based grant-free NOMA transmissions, pre-define a single sequence pool which is known to both BS and UE:

$S_{single} = \{s_1, s_2, \ldots, s_L\}$, where $L$ is the pool size.

BS can assign each UE with a unique sequence, as long as L is no less than the potential number of UEs (denoted as N) shared on the same time-frequency resource. If L<N, $S_{single}$ may be repeated and each UE may be assigned with a unique sequence from $\{S_{single}, S_{single}, \ldots\}$, e.g., the n-th user may be assigned with the sequence $S_{n \bmod L}$.

In another embodiment, $S_{single}$ may be truncated into M subsets, where $S_1 = \{s_1, \ldots, s_{L_1}\}$, $S_2 = \{s_1, \ldots, s_{L_2}\}$, ...
$S_M = \{s_1, \ldots, s_{L_M}\}$.

In this case, BS may first estimate the traffic load in real time, for example the average number of UEs shared on the same time-frequency resources N'(t) in the time interval [t−Δt, t], where 0≤N'(t)≤N, and divide [0,N] into M (M≥2) intervals, e.g., [0, $N_1$], [$N_1$, $N_2$], ..., [$N_{M-1}$, $N_M$]. For each time instant t, BS then finds m to make sure that $N_{m-1} \leq N'(t) \leq N_m$. Finally, the UEs' sequences are allocated from the sub-pool $S_m$, e.g., the n-th user may be assigned with the sequence $s_{n \bmod L_m}$.

Figure 4:
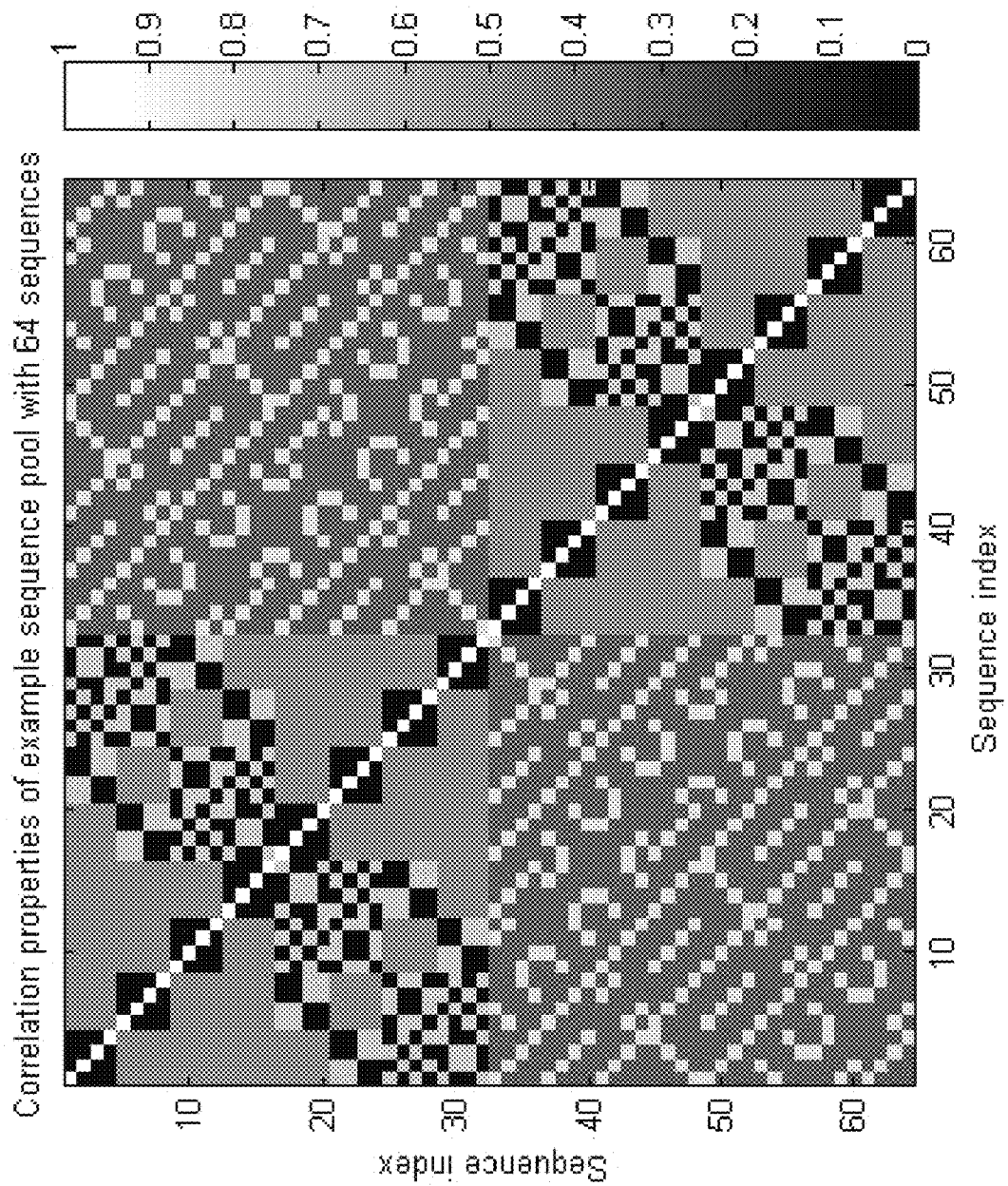
FIG. 4 shows a two-dimensional graph of orthogonality of sequences.
Figure 5:
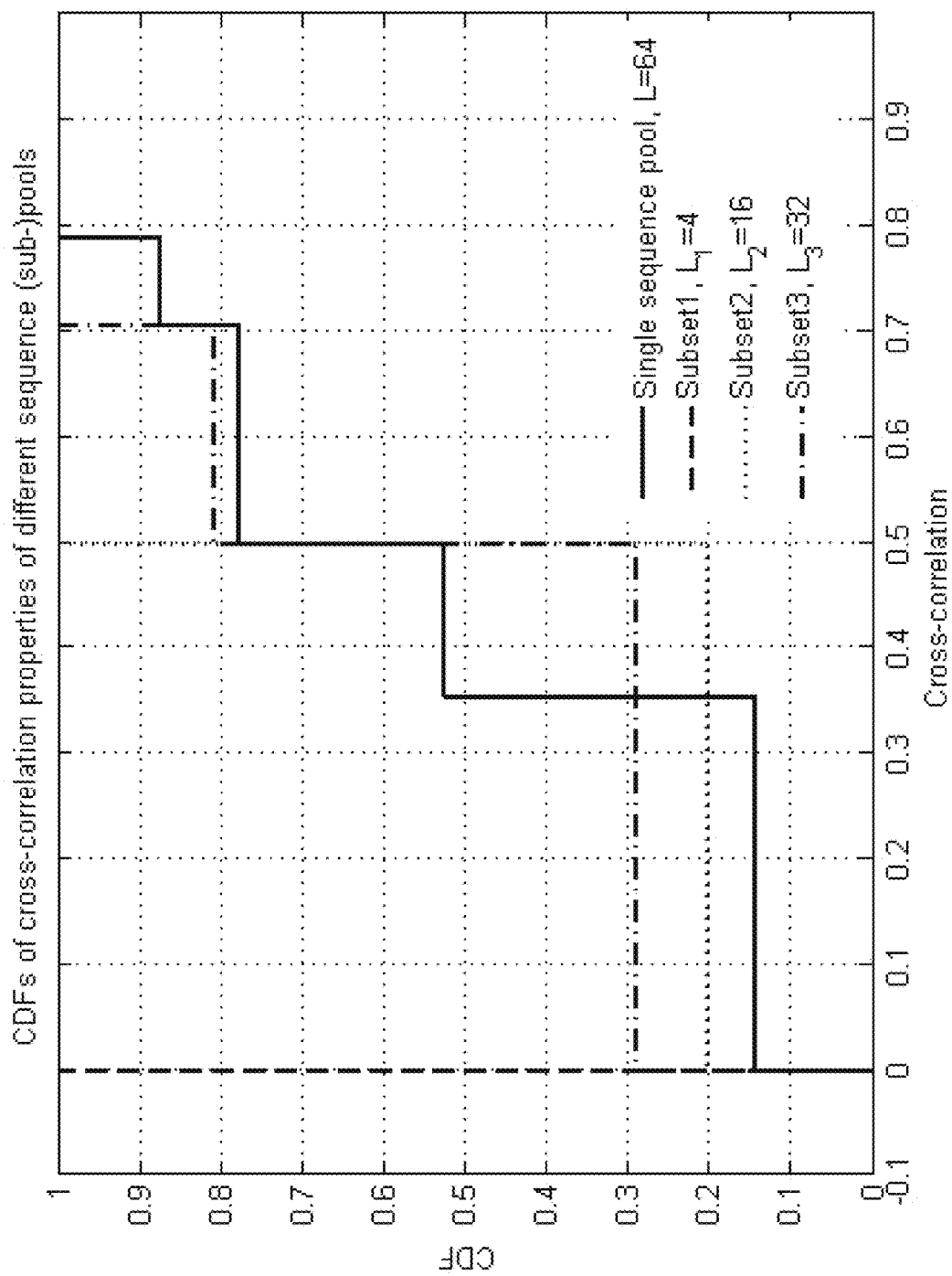
FIG. 5 is a graph showing an example of sequence orthogonality.

Table 1 below shows an example of a single sequence pool with 64 sequences whose level of orthogonality (or cross-correlation properties) is plotted as a two dimensional graph in FIG. 4. The grayscale in FIG. 4 represents the absolute value of correlations between two sequences including self-correlation. When the single pool is truncated, the overall orthogonality may change accordingly. FIG. 5 shows a graph plotting the empirical CDFs of the cross-correlation properties between any two different sequences in the single sequence pool and in the truncated subsets respectively.

TABLE 1

| MUSA sequence $s_l$ | #1 | #2 | #3 | #4 |
| --- | --- | --- | --- | --- |
| 1 | 1 | 1 | 1 | 1 |
| 2 | 1 | 1 | −1 | −1 |
| 3 | 1 | −1 | 1 | −1 |
| 4 | 1 | −1 | −1 | 1 |
| 5 | 1 | 1 | −i | i |
| 6 | 1 | 1 | i | −i |
| 7 | 1 | −1 | −i | −i |
| 8 | 1 | −1 | i | i |
| 9 | 1 | −i | 1 | i |
| 10 | 1 | −i | −1 | −i |
| 11 | 1 | i | 1 | −i |
| 12 | 1 | i | −1 | i |
| 13 | 1 | −i | −i | −1 |
| 14 | 1 | −i | i | 1 |
| 15 | 1 | i | −i | 1 |
| 16 | 1 | i | i | −1 |
| 17 | 1 | 1 | i | −1 |
| 18 | 1 | 1 | −i | 1 |
| 19 | 1 | −1 | i | 1 |
| 20 | 1 | −1 | −i | −1 |
| 21 | 1 | 1 | 1 | −i |
| 22 | 1 | 1 | 1 | i |
| 23 | 1 | −1 | −i | i |
| 24 | 1 | −1 | i | −i |
| 25 | 1 | −i | 1 | −i |
| 26 | 1 | −i | −1 | i |
| 27 | 1 | i | 1 | i |
| 28 | 1 | i | −1 | −i |
| 29 | 1 | −i | −i | 1 |
| 30 | 1 | −i | i | −1 |
| 31 | 1 | i | −i | −1 |
| 32 | 1 | i | i | 1 |
| 33 | 1 | 1 | 1 | −i |
| 34 | 1 | 1 | −1 | i |
| 35 | 1 | −1 | 1 | i |
| 36 | 1 | −1 | −1 | −i |
| 37 | 1 | 1 | −i | 1 |
| 38 | 1 | 1 | i | −1 |
| 39 | 1 | −1 | −i | −1 |
| 40 | 1 | −1 | i | 1 |
| 41 | 1 | −i | 1 | 1 |
| 42 | 1 | −i | −1 | −1 |
| 43 | 1 | i | 1 | −1 |
| 44 | 1 | i | −1 | 1 |
| 45 | 1 | −i | −i | i |
| 46 | 1 | −i | i | −i |
| 47 | 1 | i | −i | −i |
| 48 | 1 | i | i | i |
| 49 | 1 | 1 | 1 | i |
| 50 | 1 | 1 | −1 | −i |
| 51 | 1 | −1 | 1 | −i |
| 52 | 1 | −1 | −1 | i |
| 53 | 1 | 1 | −i | −1 |
| 54 | 1 | 1 | i | 1 |
| 55 | 1 | −1 | −i | 1 |
| 56 | 1 | −1 | i | −1 |
| 57 | 1 | −i | 1 | −1 |
| 58 | 1 | −i | −1 | 1 |
| 59 | 1 | i | 1 | 1 |
| 60 | 1 | i | −1 | −1 |
| 61 | 1 | −i | −i | −i |
| 62 | 1 | −i | i | i |
| 63 | 1 | i | −i | i |
| 64 | 1 | i | i | −i |

In an example, with L=64, $S_{single} = \{s_1, s_2, \ldots, s_{64}\}$ $S_1 = \{s_1, \ldots, s_4\}, S_2 = \{s_1, \ldots, s_{16}\}, S_3 = \{s_1, \ldots, s_{32}\}, S_4 = \{s_1, \ldots, s_{64}\}$ In Example 2 for SPS-based grant-free NOMA transmissions, pre-define multiple (M) sequence pools:

$S_1 = \{s_{1,1}, \ldots, s_{1,L_1}\}$, $S_2 = \{s_{2,1}, \ldots, s_{2,L_2}\}$, ...
$S_M = \{s_{M,1}, \ldots, s_{M}, \ldots, s_{M,L_M}\}$.

Although this example uses the same spreading factor for different pools, pools with the same pool size and different spreading factors may also be considered, as well as pools with different sizes.

Similar to Example 1 for SPS-based grant-free NOMA transmissions, BS may assign each UE with an unique sequence from one of the sequence pools $S_m$, as long as $L_m$ is no less than the potential number of UEs (denoted as N) shared on the same time-frequency resource. If $L_m<N$, repeat $S_m$ and assign each UE with a unique sequence from $\{S_m, S_m, \ldots\}$, e.g., the n-th user may be assigned with the sequence $s_{n \bmod L_m}$.

BS may estimate the traffic load in real time, for example the average number of UEs shared on the same time-frequency resources N'(t) in the time interval [t−Δt, t], where 0≤N'(t)≤N. Divide [0, N] into M (M≥2) intervals, e.g., [0, $N_1$], [$N_1$, $N_2$], ..., [$N_{M-1}$, $N_M$]. For each time instant t, find m to make sure that $N_{m-1} \leq N'(t) \leq N_m$. And then the UEs' sequences are allocated from the pool $S_m$, i.e., the n-th user may be assigned with the sequence $s_{n \bmod L_m}$.

Figure 6:
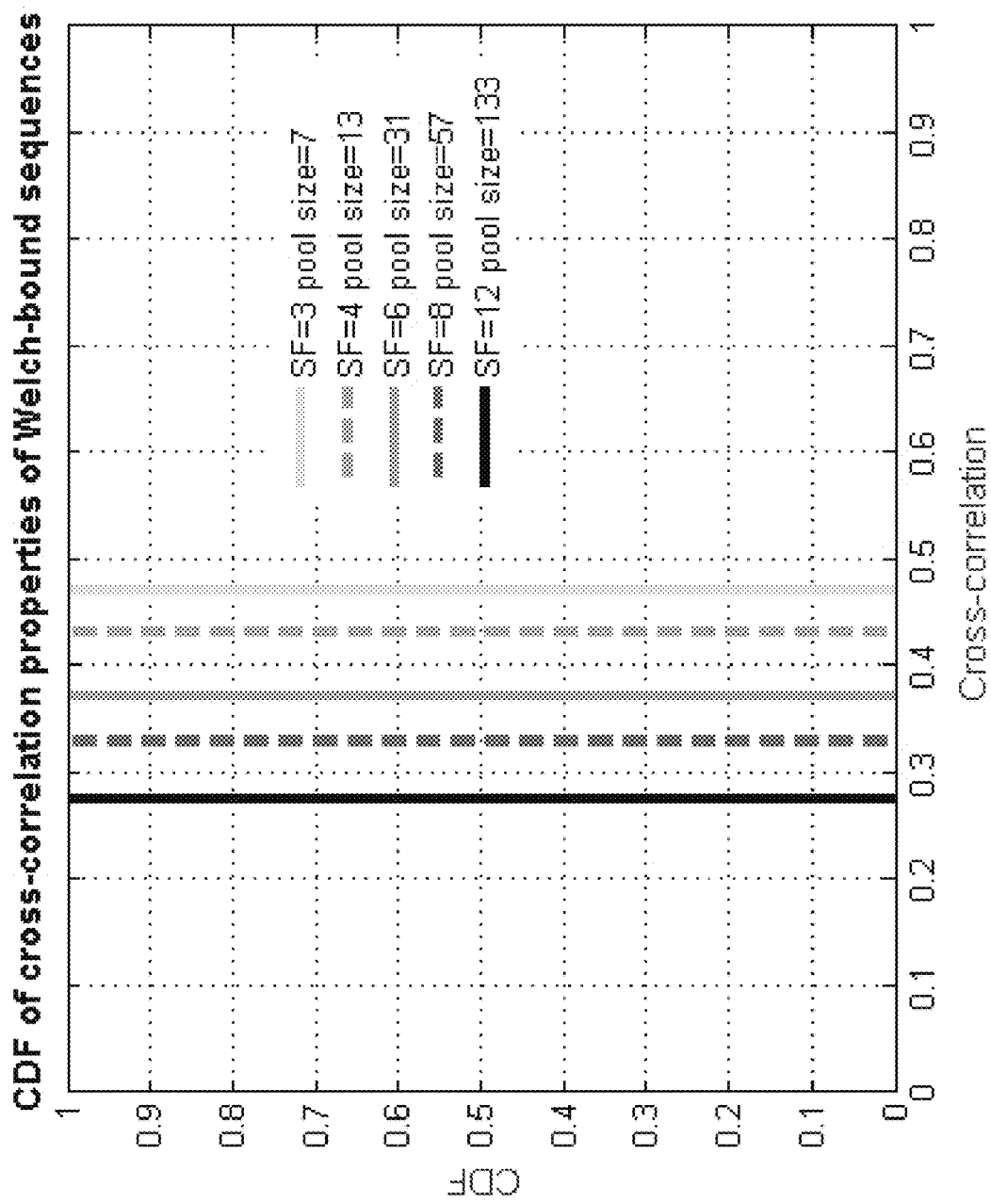
FIG. 6 is a graph showing CDF (cumulative distribution function) as a function of cross-correlation for different pool sizes or spreading factors.

FIG. 6 shows an example of multiple sequence pools where the sequences in each pool meet the Welch-bound equality. In particular, the graph shows cross-correlation statistics for different pools with different pool sizes or spreading factors. Examples of the sequences whose CDFs of cross-correlation are plotted in FIG. 6 are tabulated.

$S_1\{s_{1,1}, \ldots, s_{1,L_1}\}, L_1=7, SF=3$

TABLE 2

| Index | #1 | #2 | #3 |
|---|---|---|---|
| 1 | 0.5774 + 0.0000i | 0.5774 + 0.0000i | 0.5774 + 0.0000i |
| 2 | 0.3600 + 0.4514i | −0.1285 + 0.5629i | −0.5202 − 0.2505i |
| 3 | −0.1285 + 0.5629i | −0.5202 − 0.2505i | 0.3600 + 0.4514i |
| 4 | −0.5202 + 0.2505i | 0.3600 − 0.4514i | −0.1285 − 0.5629i |
| 5 | −0.5202 − 0.2505i | 0.3600 + 0.4514i | −0.1285 + 0.5629i |
| 6 | −0.1285 − 0.5629i | −0.5202 + 0.2505i | 0.3600 − 0.4514i |
| 7 | 0.3600 − 0.4514i | −0.1285 − 0.5629i | −0.5202 + 0.2505i |

$S_2=\{s_{2,1}, \ldots, s_{2,L_2}\}, L_2=13, SF=4$

TABLE 3

| Index | #1 | #2 | #3 | #4 |
|---|---|---|---|---|
| 1 | 0.5 | 0.5 | 0.5 | 0.5 |
| 2 | 0.5 | 0.4427 + 0.2324i | 0.0603 + 0.4964i | −0.1773 − 0.4675i |
| 3 | 0.5 | 0.2840 + 0.4115i | −0.4855 + 0.1197i | −0.3743 + 0.3316 |
| 4 | 0.5 | 0.0603 + 0.4964i | −0.1773 − 0.4675i | 0.4427 + 0.2324i |
| 5 | 0.5 | −0.1773 + 0.4675 | 0.4427 − 0.2324i | 0.0603 − 0.4964i |
| 6 | 0.5 | −0.3743 + 0.3316 | 0.2840 + 0.4115i | −0.4855 + 0.1197i |
| 7 | 0.5 | −0.4855 + 0.1197i | −0.3743 + 0.3316i | 0.2840 + 0.4115i |
| 8 | 0.5 | −0.4855 − 0.1197i | −0.3743 − 0.3316i | 0.2840 − 0.4115i |
| 9 | 0.5 | −0.3743 − 0.3316i | 0.2840 − 0.4115i | −0.4855 − 0.1197i |
| 10 | 0.5 | −0.1773 − 0.4675i | 0.4427 + 0.2324i | 0.0603 + 0.4964i |
| 11 | 0.5 | 0.0603 − 0.4964i | −0.1773 + 0.4675i | 0.4427 − 0.2324i |
| 12 | 0.5 | 0.2840 − 0.4115i | −0.4855 − 0.1197i | −0.3743 − 0.3316i |
| 13 | 0.5 | 0.4427 − 0.2324i | 0.0603 − 0.4964i | −0.1773 + 0.4675i |

$S_3=\{s_{3,1}, \ldots, s_{3,L_3}\}, L_3=31, SF=6$

TABLE 4

| Index | #1 | #2 | #3 | #4 | #5 | #6 |
|---|---|---|---|---|---|---|
| 1 | 0.4082 + 0i | 0.4082 + 0i | 0.4082 + 0i | 0.4082 + 0i | 0.4082 + 0i | 0.4082 + 0i |
| 2 | 0.3998 + 0.0821i | 0.2159 + 0.3464i | 0.1417 − 0.382i | −0.249 + 0.3228i | 0.0618 − 0.403i | 0.2812 − 0.295i |
| 3 | 0.3751 + 0.1609i | −0.179 + 0.3665i | −0.309 + −0.265i | −0.102 + −0.395i | −0.389 + −0.122i | −0.020 − 0.407i |
| 4 | 0.3350 + 0.2332i | −0.406 + 0.0413i | −0.356 + 0.1981i | 0.3751 + 0.1609i | −0.179 + 0.3665i | −0.309 − 0.265i |
| 5 | 0.2812 + 0.2958i | −0.249 − 0.322i | 0.0618 + 0.4035i | −0.356 + 0.1981i | 0.3350 + 0.2332i | −0.406 + 0.0413i |
| 6 | 0.2159 + 0.3464i | 0.1417 − 0.382i | 0.3998 + 0.0821i | 0.0618 − 0.403i | 0.2812 − 0.295i | −0.249 + 0.3228i |
| 7 | 0.1417 + 0.3828i | 0.3998 − 0.082i | 0.2159 − 0.346i | 0.2812 + 0.2958i | −0.249 − 0.322i | 0.0618 + 0.4035i |
| 8 | 0.0618 + 0.4035i | 0.2812 + 0.2958i | −0.249 − 0.322i | −0.406 + 0.0413i | −0.356 + 0.1981i | 0.3350 + 0.2332i |
| 9 | −0.020 + 0.4077i | −0.102 + 0.3952i | −0.389 + 0.1222i | 0.2159 + −0.346i | 0.1417 + 0.3828i | 0.3998 − 0.082i |
| 10 | −0.102 + 0.3952i | −0.389 + 0.1222i | −0.020 + 0.4077i | 0.1417 + 0.3828i | 0.3998 − 0.082i | 0.2159 − 0.346i |
| 11 | −0.179 + 0.3665i | −0.309 − 0.265i | 0.3751 + 0.1609i | −0.389 − 0.122i | −0.020 − 0.407i | −0.102 − 0.395i |
| 12 | −0.249 + 0.3228i | 0.0618 − 0.403i | 0.2812 − 0.295i | 0.3350 − 0.233i | −0.406 + −0.041i | −0.356 + −0.198i |
| 13 | −0.309 + 0.2659i | 0.3751 − 0.160i | −0.179 − 0.366i | −0.020 + 0.4077i | −0.102 + 0.3952i | −0.389 + 0.1222i |
| 14 | −0.356 + 0.1981i | 0.3350 + 0.2332i | −0.406 + 0.0413i | −0.309 + 0.265i | 0.3751 + 0.1609i | −0.179 + 0.3665i |
| 15 | −0.389 + 0.1222i | −0.020 + 0.4077i | −0.102 + 0.3952i | 0.3998 + 0.082i | 0.2159 − 0.346i | 0.1417 + 0.3828i |
| 16 | −0.406 + 0.0413i | −0.356 + 0.1981i | 0.3350 + 0.2332i | −0.179 + 0.3665i | −0.309 − 0.265i | 0.3751 + 0.1609i |
| 17 | −0.406 − 0.041i | −0.356 − 0.198i | 0.3350 − 0.233i | −0.179 − 0.366i | −0.309 + 0.2659i | 0.3751 − 0.160i |
| 18 | −0.389 − 0.122i | −0.020 − 0.407i | −0.102 − 0.395i | 0.3998 − 0.0821i | 0.2159 + 0.3464i | 0.1417 − 0.382i |
| 19 | −0.356 − 0.198i | 0.3350 − 0.233i | −0.406 − 0.041i | −0.309 + 0.2659i | 0.3751 − 0.160i | −0.179 − 0.366i |
| 20 | −0.309 − 0.265i | 0.3751 + 0.1609i | −0.179 + 0.3665i | −0.020 − 0.407i | −0.102 − 0.395i | −0.389 − 0.122i |
| 21 | −0.249 − 0.322i | 0.0618 + 0.4035i | 0.2812 + 0.2958i | 0.3350 + 0.2332i | −0.406 + 0.0413i | −0.356 + 0.1981i |

TABLE 4-continued

| Index | #1 | #2 | #3 | #4 | #5 | #6 |
|---|---|---|---|---|---|---|
| 22 | −0.179 − 0.366i | −0.309 + 0.2659i | 0.3751 − 0.160i | −0.389 + 0.1222i | −0.020 + 0.4077i | −0.102 + 0.3952i |
| 23 | −0.102 − 0.395i | −0.389 − 0.122i | −0.020 − 0.407i | 0.1417 − 0.382i | 0.3998 + 0.0821i | 0.2159 + 0.3464i |
| 24 | −0.020 − 0.407i | −0.102 − 0.395i | −0.389 − 0.122i | 0.2159 + 0.3464i | 0.1417 + −0.382i | 0.3998 + 0.0821i |
| 25 | 0.0618 − 0.403i | 0.2812 − 0.295i | −0.249 + 0.3228i | −0.406 + −0.041i | −0.356 + −0.198i | 0.3350 + −0.233i |
| 26 | 0.1417 − 0.382i | 0.3998 + 0.0821i | 0.2159 + 0.3464i | 0.2812 + −0.295i | −0.249 + 0.3228i | 0.0618 + −0.403i |
| 27 | 0.2159 − 0.346i | 0.1417 + 0.3828i | 0.3998 + −0.082i | 0.0618 + 0.4035i | 0.2812 + 0.2958i | −0.249 − 0.322i |
| 28 | 0.2812 − 0.295i | −0.249 + 0.3228i | 0.0618 − 0.403i | −0.356 − 0.198i | 0.3350 − 0.233i | −0.406 − 0.041i |
| 29 | 0.3350 − 0.233i | −0.406 + −0.041i | −0.356 − 0.198i | 0.3751 − 0.160i | −0.179 − 0.366i | −0.309 + 0.2659i |
| 30 | 0.3751 − 0.160i | −0.179 − 0.366i | −0.309 + 0.2659i | −0.102 + 0.3952i | −0.389 + 0.1222i | −0.020 + 0.4077i |
| 31 | 0.3998 − 0.082i | 0.2159 − 0.346i | 0.1417 + 0.3828i | −0.249 − 0.322i | 0.0618 + 0.4035i | 0.2812 + 0.2958i |

In random selection based grant-free transmission, UE's resources including time-frequency resources and MA signatures are randomly selected by UE; this configuration is mainly used for uplink data transmission when the UEs' data transmission are in RRC-idle or inactive mode. Although BS may not know how many UEs may possibly transmit data, the number of UEs that may initiate the uplink transmissions can be blindly detected by BS at each time. When the uplink traffic load is dynamically changing, it may be necessary to adjust the random selection scheme to control the overall interference level.

In some embodiments, BS can calculate the statistics of the number of successfully detected UEs periodically or triggered by event. For example, the event may be an increase in uplink transmission initiations, a received report or request, or the like. BS may adjust the pool(s) of MA signatures through broadcasting or group-common signaling according to the number of active UEs in real time.

In some embodiments, UEs may need to receive the parameter(s) signaled by BS (e.g., gNB or network node), and then adjust the random selection scheme, e.g., change the pool for random selection, or change the distribution of randomness.

The MA signature pool used for embodiments of random selection based grant-free transmissions is the same as that defined for SPS-based grant-free.

In Example 1 for random selection based grant-free NOMA transmissions, pre-define a single sequence pool $S_{single}$ which is known to both BS and UE.

Additionally, Pre-define one or multiple random distribution types, e.g., uniform (two parameters [$N_{min}$, $N_{max}$]), exponential decaying (one parameter λ), log-normal (two parameters [μ, σ]), which is/are known to both BS and UE.

A default distribution and the corresponding parameter(s) should be applied for UE random selection if there is no broadcasting/signaling received.

In some embodiments, each UE may randomly choose one sequence from the MA signature pool based on the pre-defined random selection scheme(s) and the received parameter(s) of traffic load from BS.

In some embodiments, one type of random distribution may be pre-defined, and the parameter(s) of the distribution for UE random selection may be obtained from BS broadcasting/signaling.

In other embodiments, multiple types of random distributions, with each distribution being associated with fixed parameter(s), may be pre-defined, and which of the distributions is to be used by UE is obtained from BS broadcasting/signaling.

In yet other embodiments, multiple types of random distributions, where each of distribution is associated with multiple parameter(s), may be pre-defined, and which distribution and which parameter(s) to be used by UE are obtained from BS broadcasting/signaling.

In this example, BS may estimate the traffic load in real time, for example the average number of UEs shared on the same time-frequency resources N'(t) in the time interval [t−Δt, t], where 0≤N'(t)≤N. BS may signal either the number or an indication of the number to UE, and may further signal which distribution and/or which parameter(s) to be used by UE. In some embodiments, this signaling may be based on a pre-defined rules known to both BS (e.g., gNB or network node) and UE.

In Example 2 for random selection based grant-free NOMA transmissions, pre-define multiple sequence pools $S_1$, $S_2$, . . . , $S_M$ which are known to both BS and UE.

Additionally, pre-define one or multiple random distribution types for each pool, e.g., uniform (two parameters [$N_{min}$, $N_{max}$]), exponential decaying (one parameter λ), log-normal (two parameters [μ, σ]), which is/are known to both BS and UE.

In some embodiments, a default pool, distribution and corresponding parameter set may be applied for UE random selection if there is no broadcasting/signaling received.

In other embodiments, each UE may randomly choose one sequence from one of the pools based on the pre-defined random selection scheme(s) and the received parameter(s) of traffic load from BS. In an example, which sequence pool, which distribution and which parameter set may be used for UE random selection may be obtained from BS broadcasting/signaling.

In yet other embodiments, if only one distribution or only one parameter set in a distribution is pre-configured, then only an indication of which sequence pool to be used for UE random selection may be obtained from BS broadcasting/signaling.

In this example, BS estimates the traffic load in real time, for example the average number of UEs shared on the same time-frequency resources N'(t) in the time interval [t−Δt, t], where $0 \le N'(t) \le N$. BS may signal either the number or an indication of the number to UE, which sequence pool, which distribution and/or which parameter(s) to be used by UE, and may be determined based on a pre-defined rule known to both BS and UE.

It will be appreciated that the present document describes techniques for sequence selection in non-orthogonal multiple access scenarios. These techniques can be embodied into network nodes (e.g., base stations, gNB) or user devices.

In some embodiments, MA signatures may be introduced in the transmitter side processing of uplink NOMA transmissions, to reduce the inter-user interferences. For grant-free contention-based uplink NOMA transmission, BS may blindly detect the traffic load in terms of average number of UEs shared on the same time-frequency resources.

In some embodiments, and based on the calculation or estimation of traffic load, BS may adjust the configurations of UE's MA signatures to control the overall interference level.

In some embodiments, BS may broadcast/signal/indicate the calculated or estimated traffic load, and UE random selection scheme may be accordingly adjusted to reduce the overall interference level.

Figure 7:
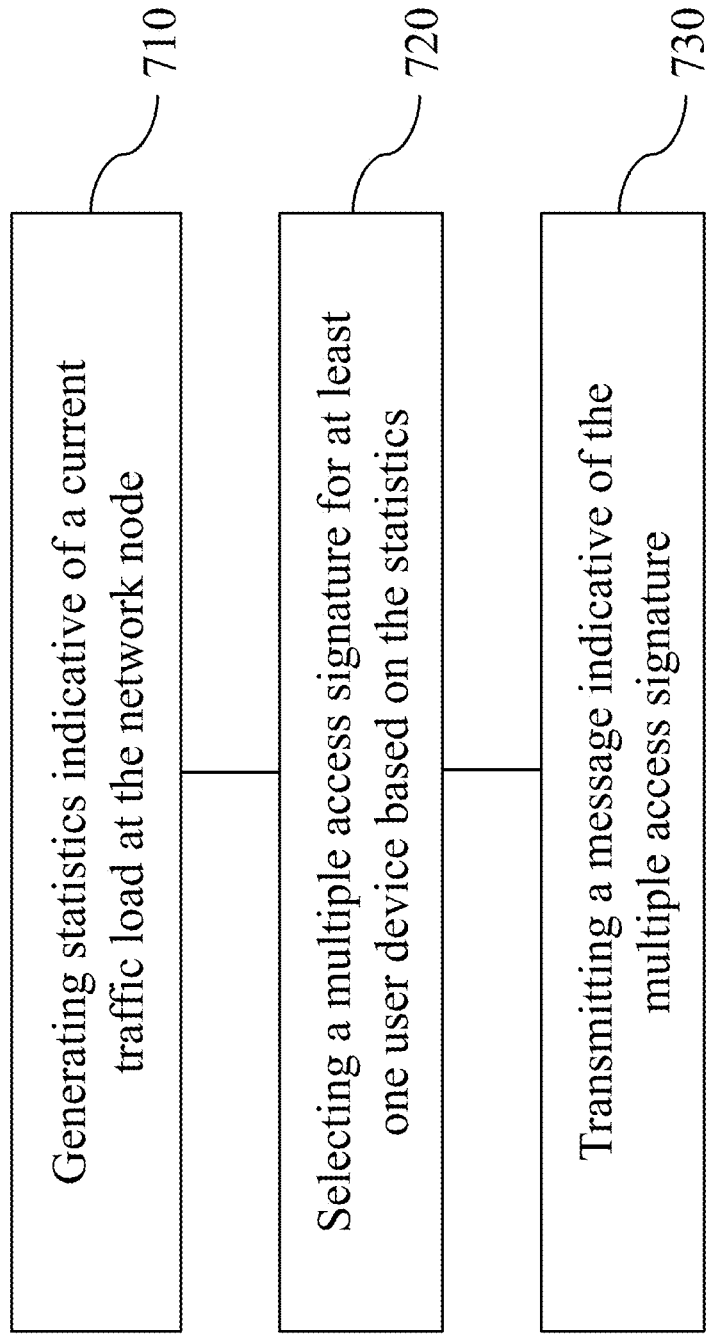
FIG. 7 shows an example of a wireless communication method carried out on a communication node or network node.

FIG. 7 shows an example of a wireless communication method carried out on a communication node (or network node, or base station), in accordance with some embodiments of the presently disclosed technology. The method includes, at step 710, generating statistics indicative of a current traffic load at the base station. In an example, the base station may know how many UEs are connected to itself, but may blindly detect how many UEs are initiating uplink transmissions at any time. Determining a dynamically changing uplink traffic load may enable the base station to adjust the configuration or selection process so as to control the overall interference level.

The method includes, at step 720, selecting a multiple access signature for at least one user device (or UE) based on the statistics that are indicative of a current traffic load at the base station. In some embodiments, the MA signature may be selected for the at least one user device based on the examples, for both SPS-based and random selection based grant-free NOMA transmissions, provided in this document. In other embodiments, the MA signature may be selected from a MA signature pool (or set) as described in this document. In yet other embodiments, the size of the MA signature pool and the spreading factors of the MA signatures may be based on the indication of the current traffic load.

The method includes, at step 730, transmitting a message indicative of the multiple access signature to the respective user device. In some embodiments, the message indicative of the MA signature may be transmitted via RRC signaling, broadcast signaling, or common-group signaling, and according to the examples for SPS-based and random selection based grant-free NOMA transmissions, as described in this document.

Figure 8:
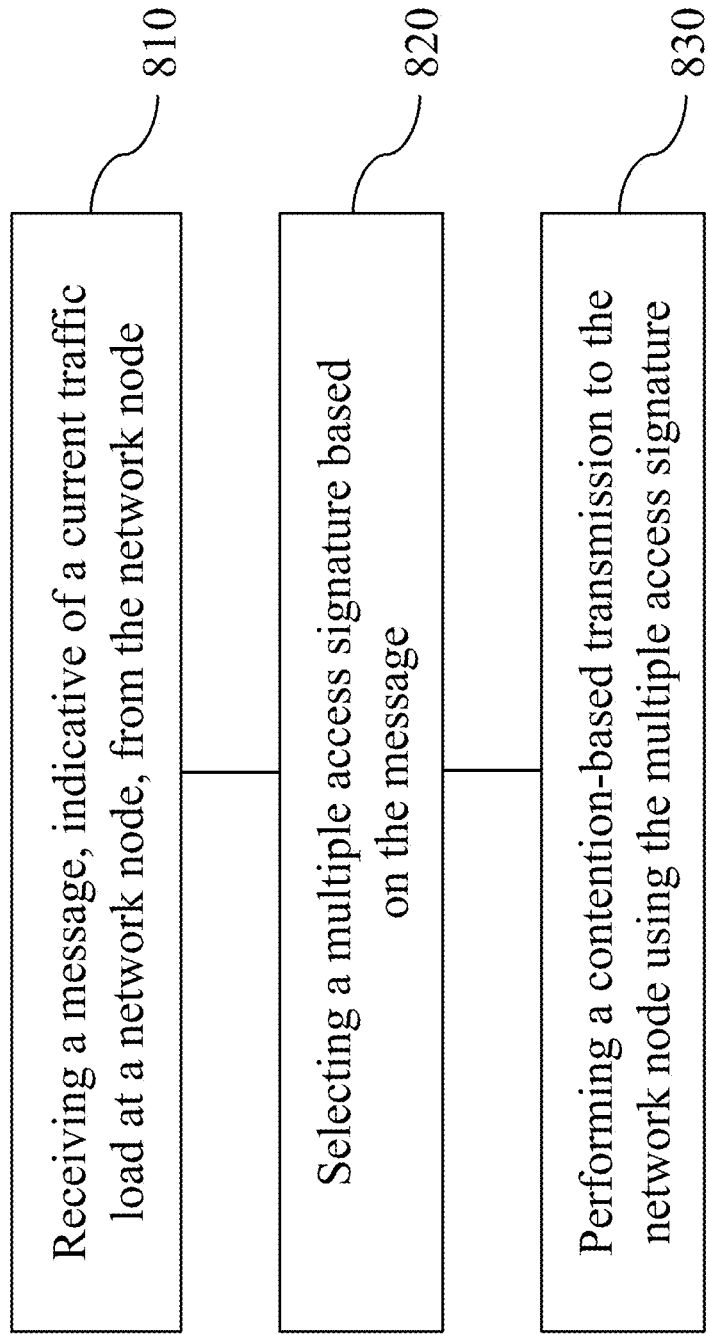
FIG. 8 shows an example of a wireless communication method carried out on a wireless communication apparatus or user equipment.
Figure 9:
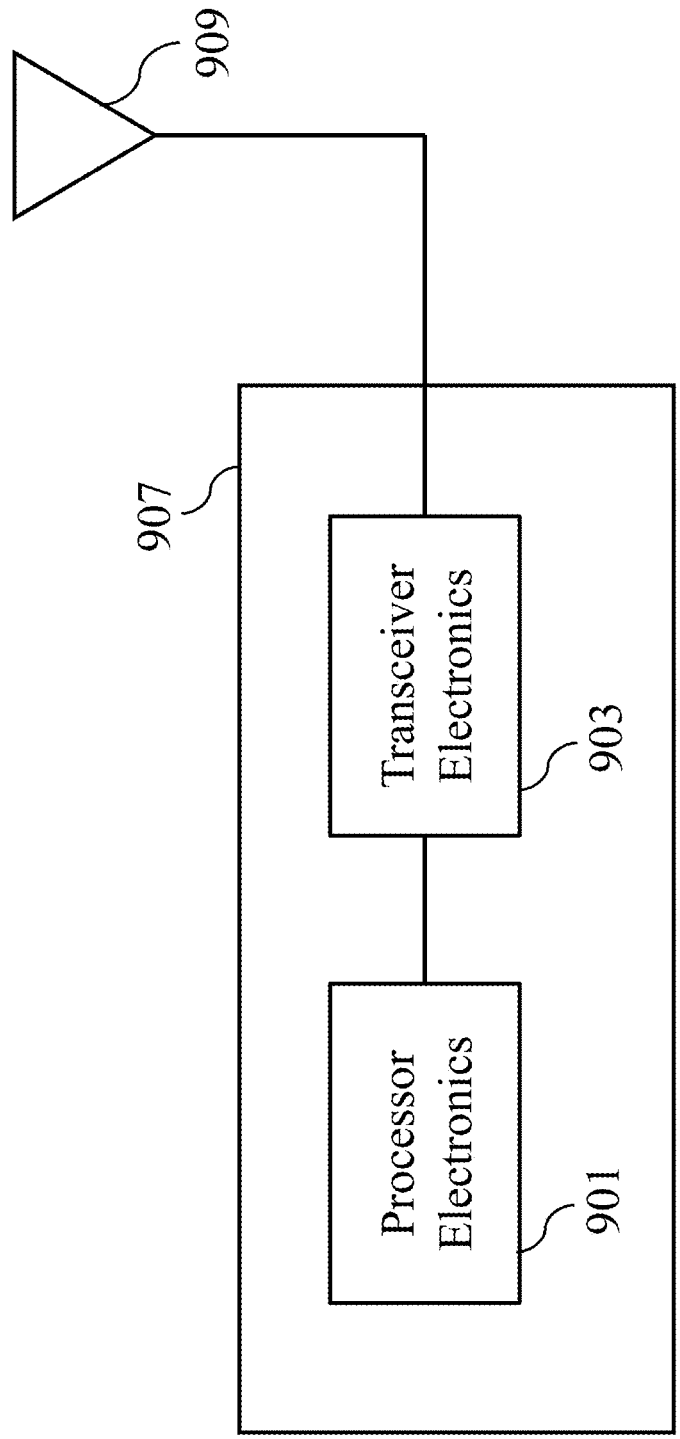
FIG. 9 is a block diagram representation of a portion of a radio station.

FIG. 8 shows an example of a wireless communication method carried out on a wireless communication apparatus (or user equipment), in accordance with some embodiments of the presently disclosed technology. The method includes, at step 810, receiving a message from the network node, where the message is indicative of current traffic load at the network node the UE is attempting to communicate with. In some embodiments, the message may be received via RRC signaling, broadcast signaling, or common-group signaling, and according to the examples for SPS-based and random selection based grant-free NOMA transmissions, as described in this document.

The method includes, at step 820, selecting a multiple access signature based on the message. As described in this document, the selection may be made from a MA signature pool, or sub-pools, according to the examples and embodiments provided herein.

The method includes, at step 830, performing a contention-based transmission to the network node using the selected multiple access signature. The transmission from the UE may be subject to reduced interference levels due to the selection of the MA signature sequence based on an estimate of the current traffic load at the base station it is communicating with.

FIG. 6 is a block diagram representation of a portion of a radio station, in accordance with some embodiments of the presently disclosed technology. A radio station 605, such as a base station or a wireless device (or UE), can include processor electronics 610 such as a microprocessor that implements one or more of the techniques presented in this document. The radio station 605 can include transceiver electronics 615 to send and/or receive wireless signals over one or more communication interfaces such as antenna(s) 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc., that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication implemented at a network node, the method comprising:
   generating statistics indicative of a current traffic load at the network node, wherein the statistics comprise a quantity of user devices communicatively connected to the network node, and an average number of user devices sharing a same resource or an equivalent average traffic arrival rate;
   selecting a multiple access (MA) signature for a user device based on the statistics, wherein the MA signature is used to receive a contention-based transmission; and
   transmitting a message indicative of the MA signature.

2. The method of claim 1, wherein the generating the statistics comprises:
   determining a number of user devices that are initiating uplink transmissions;
   periodically generating the statistics; or
   receiving a trigger for an event and determining the statistics in response to the trigger.

3. The method of claim 2, wherein the message is transmitted to cause at least one of the number of user devices to initiate the uplink transmission in response to receiving the message.

4. The method of claim 1, wherein the transmitting the message comprises:
   communicating the message using radio resource control signaling;
   broadcasting the message; or
   group-common signaling the message.

5. The method of claim 1, wherein the selecting the MA signature comprises:
   selecting the MA signature from at least one set of MA signature sequences.

6. The method of claim 5, wherein a size of the at least one set of MA signature sequences is based on the statistics indicative of the current traffic load at the network node, and wherein the at least one set of MA signature sequences is predefined and known to the user device.

7. The method of claim 1, wherein the selecting the MA signature comprises:
   randomly selecting the MA signature from at least one set of MA signature sequences, wherein the randomly selecting the MA signature is based on at least one random distribution and associated random distribution parameters.

8. A method for wireless communication implemented at a user device, the method comprising:
   receiving a message from a network node, wherein the message includes statistics indicative of a current traffic load at the network node, wherein the statistics comprise a quantity of user devices communicatively connected to the network node, and an average number of user devices sharing a same resource or an equivalent average traffic arrival rate;
   selecting a multiple access (MA) signature based on the message; and
   performing a contention-based transmission to the network node using the MA signature.

9. The method of claim 8, wherein the message is received via:
   radio resource control signaling;
   group-common signaling; or
   broadcast signaling.

10. The method of claim 8, wherein selecting the MA signature comprises:
    selecting the MA signature from at least one set of MA signature sequences, wherein a size of the at least one set of MA signature sequences is based on the indication of the current traffic load at the network node.

11. The method of claim 10, wherein the at least one set of MA signature sequences is predefined and known to the user device.

12. The method of claim 8, wherein selecting the MA signature comprises:
    randomly selecting the MA signature from at least one set of MA signature sequences.

13. The method of claim 12, wherein the randomly selecting the MA signature is based on at least one random distribution and associated random distribution parameters.

14. The method of claim 13, wherein the at least one random distribution comprises one or more of a uniform distribution, an exponentially decaying distribution, and a log-normal distribution.

15. The method of claim 8, wherein the statistics indicative of the current traffic load further comprise an average number of user devices sharing a same resource or an equivalent average traffic arrival rate.

16. A network node apparatus comprising:
at least one processor and memory containing instructions that when executed perform operations comprising:
generating statistics indicative of a current traffic load at the network node, wherein the statistics comprise a quantity of user devices communicatively connected to the network node, and an average number of user devices sharing a same resource or an equivalent average traffic arrival rate;
selecting a multiple access (MA) signature for a user device based on the statistics, wherein the MA signature is used to receive a contention-based transmission; and
transmitting a message indicative of the MA signature.

17. The apparatus of claim 16, wherein the generating the statistics comprises:
determining a number of user devices that are initiating uplink transmissions;
periodically generating the statistics; or
receiving a trigger for an event and determining the statistics in response to the trigger.

18. The apparatus of claim 16, wherein the transmitting the message comprises:
communicating the message using radio resource control signaling;
broadcasting the message; or
group-common signaling the message.

19. The apparatus of claim 16, wherein the statistics indicative of the current traffic load further comprise an average number of user devices sharing a same resource or an equivalent average traffic arrival rate.

20. An apparatus included at a user device, the apparatus comprising:
at least one processor and memory containing instructions that when executed perform operations comprising:
receiving a message from a network node, wherein the message includes statistics indicative of a current traffic load at the network node, wherein the statistics comprise a quantity of user devices communicatively connected to the network node, and an average number of user devices sharing a same resource or an equivalent average traffic arrival rate;
selecting a multiple access (MA) signature based on the message; and
performing a contention-based transmission to the network node using the MA signature.

21. The apparatus of claim 20, wherein the message is received via:
radio resource control signaling;
group-common signaling; or
broadcast signaling.

22. The apparatus of claim 20, wherein the selecting the MA signature comprises:
randomly selecting the MA signature from at least one set of MA signature sequences, wherein the randomly selecting the MA signature is based on at least one random distribution and associated random distribution parameters.

* * * * *